United States Patent [19]
Penz et al.

[11] Patent Number: 4,954,963
[45] Date of Patent: Sep. 4, 1990

[54] NEURAL NETWORK AND SYSTEM

[75] Inventors: Perry A. Penz; Michael T. Gately, both of Richardson, Tex.

[73] Assignee: Texas Instruments Incorporated, Dallas, Tex.

[21] Appl. No.: 318,038

[22] Filed: Mar. 2, 1989

[51] Int. Cl.⁵ .................................... G06F 15/18
[52] U.S. Cl. ............................ 364/513; 382/15
[58] Field of Search ............ 364/513, 900, 200, 274.9, 364/276.6, 917.95; 382/14, 15

[56] References Cited
PUBLICATIONS
Electronic System Design Magazine; vol. 18, No. 17; Wilson; Do DARPA's Androids Dream of Electric Sheep?; Jul. 1988.

*Primary Examiner*—Allen MacDonald
*Attorney, Agent, or Firm*—Carlton H. Hoel; N. Rhys Merrett; Melvin Sharp

[57] ABSTRACT

Neural network systems (100) with learning and recall are applied to clustered multiple-featured data (122,124,126) and analog data.

7 Claims, 5 Drawing Sheets

NEURAL NETWORK AND SYSTEM

STATEMENT AS TO RIGHTS TO INVENTIONS MADE UNDER FEDERALLY SPONSORED RESEARCH AND DEVELOPMENT

The U.S. Government has a paid-up license in this invention and the right in limited circumstances to require the patent owner to license others on reasonable terms as provided for by the terms of Contract No. F33615-87-C-1454 awarded by the U.S. Air Force.

CROSS-REFERENCE TO RELATED APPLICATIONS

Copending U.S. patent applications Ser. Nos. 032,887, filed Mar. 31, 1987 (Penz), 010,619, filed Feb. 4, 1987 (Frazier), and 057,887, filed Jun. 1, 1987 (Provence) disclose related subject matter. All of these cross-referenced applications are assigned to the assignee of this application and are hereby incorporated by reference.

BACKGROUND OF THE INVENTION

1. Field of the Invention

The present invention relates to computation, and, more particularly, to neural network information and signal processing.

2. Description of the Related Art.

Avionics sensor systems typically are confronted with the problem of identifying the emitters of various electromagnetic signals (i.e., radar pulses) being received. The known sensor systems typically include an antenna, a preprocessor, a pulse buffer, a digital signal processor, and a classifier. The antenna receives signals from various emitters with various frequencies, pulse widths, pulse repetition rates, locations, and so forth. The antenna output is preprocessed to extract a set of features for each received pulse. The set of features is processed by standard signal processing methods to cluster the pulses from each perceived emitter, and the classifier compares the features of each perceived emitter with pre-stored data to determine its identity. All of this analysis would take place in a homing missile which would then decide which of the perceived emitters to attack. However, the known sensor systems have the problem of extracting the emitter identity information from the mass of incoming pulses; the computing power required for standard digital signal processing in real time cannot be effectively put into every homing missile.

Attempts to understand the functioning of the human brain have led to various "neural network" models in which large numbers of neurons are interconnected. These models roughly presume each neuron exists in one of two states (quiescent and firing) with the state determined by the states of connected nuerons (if enough connected neurons are firing, then the original neuron should be in the firing state); and the thrust of the models is to perform computations such as pattern recognition with the neural networks. The models may be simple feedforward layered structures with an input layer of neurons, one or more hidden layers of neurons, and an output layer of neurons. Other models have feedback among the neurons and correspondingly more involved behavior.

J. Hopfield, Neural Networks and Physical Systems with Emergent Collective Computational Abilities, 79 Proc. Natl. Acad. Sci. USA 2554 (1982) describes a neural network model with N neurons each of which has the value 0 or 1 (corresponding to quiescent and to firing), so the state of the network is then a N-component vector $V=[V_1, V_2, \ldots, V_N]$ of 0's and 1's which depends upon time. The neuron interconnections are described by a matrix $T_{i,j}$ defining the influence of the $j^{th}$ neuron on the $i^{th}$ neuron. The state of the network evolves in time as follows: each neuron i has a fixed threshold $\theta_i$ and readjusts its state $V_i$ randomly in time by setting $V_i$ equal to 0 or 1 depending on whether $$\sum_j T_{i,j} V_j - \theta_i$$

is negative or positive. All neurons have the same average rate of readjustment, and the readjustments define a dynamic flow in state space.

With the assumption that $T_{i,j}$ is symmetric, the potential function $$\sum_i \sum_j T_{i,j} V_i V_j$$

can be used to show that the flow of the network is to local minima of the potential function. Further, with a given set of uncorrelated N-component vectors $U^1, U^2, \ldots, U^s$, a $T_{i,j}$ can be defined by $$T_{i,j} = \sum_{1 \le k \le s} (2U_i^k - 1)(2U_j^k)$$

and with the thresholds equal to 0, these $U^k$ are the fixed points of the flow and thus stable states of the network. This is a type of "outer product storage" of the vectors $U^1, U^2, \ldots, U^s$. Such a network can act as a content-addressable memory as follows: the memories to be stored in the network are used to construct the $U^k$ and hence $T_{i,j}$, so the stored memories are fixed points of the flow. Then a given partial memory is input by using it to define the initial state of the network, and the state will flow usually to the closest fixed point/stable state $U^k$ which is then the memory recalled upon input of the partial memory.

Further analysis and modified network models appear in, for example, J. Hopfield et al, Computing with Neural Circuits: A Model, 233 Science 625 (1986) and J. Hopfield, Neurons with Graded Response Have Collective Computational Properties like Those of Two-State Neurons, 81 Proc. Natl. Acad. Sci. USA 3088 (1984).

L. Cooper, A Possible Organization of Animal Memory and Learning, Proc. Nobel Symp. Coll. Prop. Phys. Sys. 252 (Academic, New York 1973) observes that the modelling of neural network for animal memory and learning has the problem of mapping events in the animal's environment (i.e., sensory output) to signal distributions in the animal's neurons with the fundamental property of preserving closeness or separateness (in some sense not yet completely defined) of the events. That is, with a vector representation of the neural network states, two events as similar as a white cat and a gray cat should map into vectors which are close to parallel while two events as different as the sound of a bell and the sight of food should map into vectors that are close to orthogonal. Note that standard analysis, such as described in Gonzalez and Wintz, Digital Image Processing (Addison-Wesley 1977), does not use neural network computation and does not have this problem; rather, the standard analysis attempts to extract features and categorize by serial number crunching.

J. Anderson, Cognitive Capabilities of a Parallel System, NATO Advanced Research Workshop (Mar. 3, 1985) describes the Brain State in a Box (BSB) neural network model which includes outerproduct storage, Widrow-Hoff learning, and a ramped-threshold recall algorithm. That is, the matrix of interconnection strengths, $T_{i,j}$, is modified to learn a new vector $V_j$ by $$\Delta T_{i,j} = \frac{\eta}{N}\left[\sum_{1 \leq k \leq N} T_{i,k}V_k - V_i\right]V_j$$

where $\eta$ is a learning constant and N is number of neurons. The learning constant is roughly the inverse of the number of times the matrix must be trained on a given vector before it fully learns the vector. The smaller the learning constant, the finer the resolution of the average direction for a learned state but the more times the input vectors must be trained. The learning procedure saturates when $\Delta T_{i,j}$ is close to zero, which implies that the vector is close to being an eigenvector of the matrix with an eigenvalue near 1.

Recall of a learned (stored) vector given an input vector $U_j$ is by the following interative process that converges towards an eigenvector:

$$U_j(t + 1) = \text{Limit}\left[\gamma \sum_{1 \leq k \leq N} T_{j,k}U_k(t) + \beta U_j(t)\right]$$

where the "Limit" function clamps the values in the range from $-1$ to 1. The constants $\gamma$ and $\beta$ measure the feedback and signal decay in the algorithm. This synchronous recall algorithm replaces the dynamic flow of the Hopfield model. The usual applications of the BSB neural network such as data bases with words and letters encoded as their ASCII representations require binary neurons as in the first Hopfield model.

SUMMARY OF THE INVENTION

The present invention provides analog behavior in a neural network to learn either binary or analog vectors and recall vectors that include information regarding the clustering of the learned vectors. Further, for multiple feature signal processing the features are concatenated to form vectors for learning but the learning is limited to avoid saturation. Preferred embodiments include use of such neural networks in avionics sensor systems wherein binary data learned by the network has some of its statistical properties revealed by the analog aspects of the recalled vectors. Preferred embodiments also use such neural networks for look-up table type information storage for emitter identification.

BRIEF DESCRIPTION OF THE DRAWINGS

The drawings are schematic for clarity.

DESCRIPTION OF THE PREFERRED EMBODIMENTS

The known radar sensor systems typically include an antenna, a preprocessor, a pulse buffer, a digital signal processor, and a classifier. The antenna receives radar signals from various emitters with various frequencies, pulse widths, pulse repetition rates, locations, and so forth. The antenna output is preprocessed to extract a set of features (frequency of the pulse, pulse width, signal-to-noise ratio for the pulse, and azimuthal and elevational angles towards the emitter) and time of arrival for each received radar pulse and periodically store a table of such features in a buffer. The stored set of features is processed by standard signal processing methods to cluster the pulses from each perceived emitter, and the classifier compares the features of each perceived emitter with pre-stored data to determine its identity. All of this analysis would take place in a homing missile which would then decide which of the perceived emitters to attack.

Figure 1:
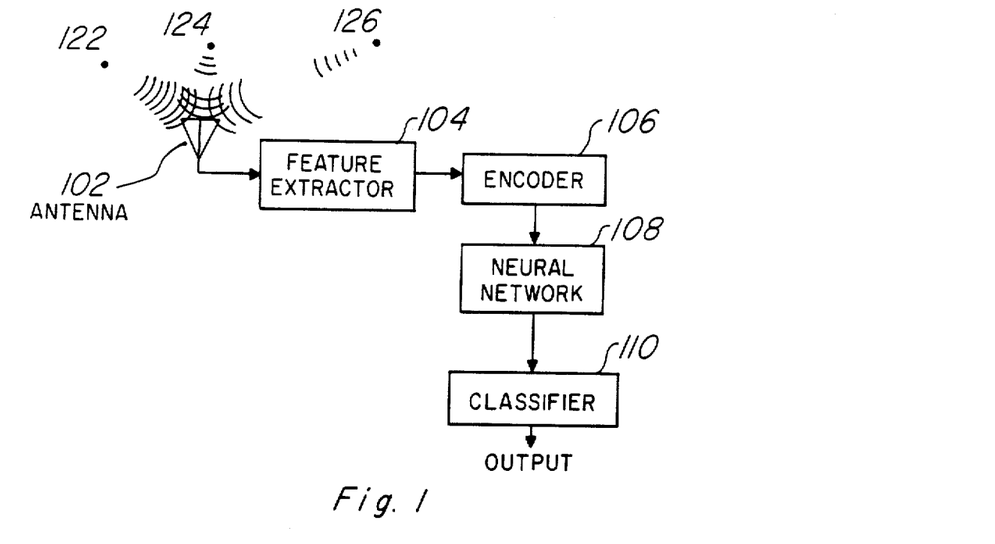
FIG. 1 illustrates in block form a first preferred embodiment sensor system.

FIG. 1 illustrates, in schematic block form, a first preferred embodiment radar sensor system 100 and includes antenna 102, preprocessor for feature extraction 104, encoder 106, neural network 108, and classifier 110. Antenna 102 and feature extractor 104 are the same as in the known systems. Antenna 102 receives radar pulses from various radar emitters 122, 124, 126, . . . , and the pulses are analyzed as received by feature extractor 104 according to the direction of the pulse (azimuth and elevation angles), the signal-to-noise ratio, the frequency, and the pulse width to produce a data stream such as in the following table:

| Pulse number | Azimuth (deg) | Elevation (deg) | Sig/Noise (dB) | Freq. (MHz) | Pulse Width ($\mu$sec) | Time of arrival |
|---|---|---|---|---|---|---|
| 1 | 21 | −20 | −109 | 9066 | 2.186 | 1 |
| 2 | 34 | −35 | −98 | 9437 | 1.489 | 12 |
| 3 | −12 | 27 | −81 | 9214 | 0.399 | 20 |
| 4 | −6 | −34 | −85 | 10054 | 0.421 | 53 |
| 5 | −26 | 0 | −86 | 9210 | 0.397 | 58 |
| 6 | 23 | −17 | −108 | 9030 | 2.191 | 75 |
| 7 | 16 | −16 | −97 | 9342 | 1.399 | 97 |
| 8 | 21 | −22 | −108 | 9015 | 2.195 | 112 |
| 9 | −25 | −30 | −83 | 9023 | 0.416 | 117 |
| 10 | 19 | −21 | −109 | 0932 | 2.195 | 149 |
| 11 | 8 | −29 | −83 | 9805 | 7.156 | 164 |
| 12 | 20 | −17 | −109 | 9018 | 2.21 | 186 |
| 13 | 20 | −19 | −96 | 9335 | 1.402 | 213 |
| 14 | 23 | −21 | −108 | 9041 | 2.207 | 223 |
| 15 | 32 | −30 | −98 | 9435 | 1.375 | 251 |
| 16 | 24 | −21 | −108 | 9051 | 2.21 | 260 |
| 17 | 22 | −20 | −109 | 9011 | 2.194 | 297 |

-continued

| Pulse number | Azimuth (deg) | Elevation (deg) | Sig/Noise (dB) | Freq. (MHz) | Pulse Width (μsec) | Time of arrival |
|---|---|---|---|---|---|---|
| 18 | 19 | −17 | −97 | 9345 | 1.384 | 330 |
| 19 | 25 | −20 | −109 | 8997 | 2.185 | 334 |
| 20 | 23 | −19 | −109 | 9049 | 2.215 | 371 |

The data stream is temporarily stored in a pulse buffer. Combat conditions may be expected to yield an output from extractor 104 of 300 table entries during a 10 millisecond interval; at the end of each 10 millisecond interval the pulse buffer is unloaded. The data is encoded by encoder 106 to be compatible with binary neurons in neural network 108, although neural network 108 has analog neurons. In particular, each neuron of neural network 108 may take on real number values between −1 and 1 but the encoder 106 only produces outputs of −1 and 1. Neural network 108 has 400 neurons, and the neurons are grouped with 50 neurons for azimuth, 50 neurons for elevation, 50 neurons for signal-to-noise, 150 neurons for frequency, and 100 neurons for pulse width. Thus a state of neural network 108 is a 400-component vector of real numbers between −1 and 1 with the first 50 components relating to the azimuth, the second 50 relating to the elevation, the third 50 relating to the signal-to-noise ratio, the next 150 relating to frequency, and the last 100 relating to the pulse width.

Figure 2:
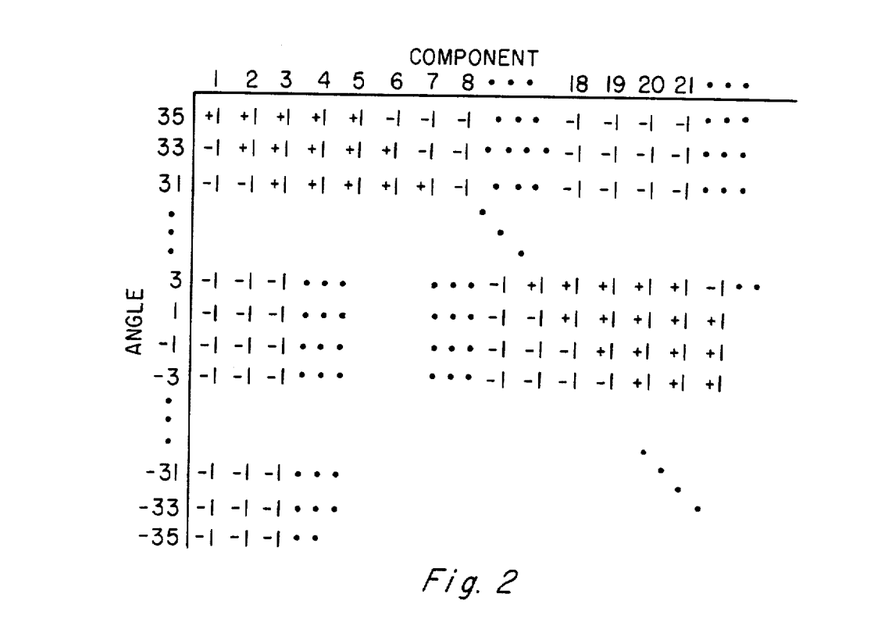
FIG. 2 shows encoding for the first preferred embodiment.

Encoder 106 uses a closeness code, its encoding method is illustrated in FIG. 2 for the case of encoding the azimuth data in degrees (ranging from −35 to +35 in 2 degree intervals) to network 108 compatible input vectors of −1's and 1's. FIG. 2 shows that a number is encoded by the position of a block of five +1's in the otherwise all −1 components of the state vector. The other data is similarly encoded, except that the numerical interval corresponding to the next neuron depends upon the spread of the data. For example, the frequency data (expressed in MHz) has a spread of about 1100, so the 150 neurons could (with a block of 22 +1's for the position indicator) represent 128 numbers which translates to an interval of about 9 MHz. The frequency data is encoded with the position of a block of twenty-two +1's rather than the block of five +1's of the other data because the frequency of an emitter may be varied to deter detection, and overlap of the blocks of +1's for different vectors corresponding to the same emitter is required for network 108 to cluster the data to identify the emitters. This is explained in more detail in connection with the operation of network 108. Two vectors are close in Hamming distance if and only if the two sets of pulse feature numbers are close.

Figure 3:
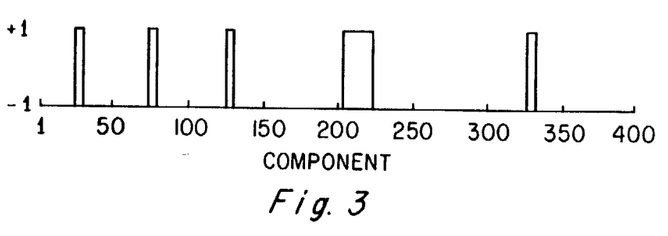
FIG. 3 shows encoded data for the first preferred embodiment.

For example, a 400-component vector [−1 (18), +1 (5), −1 (53), +1 (5), −1 (55), +1 (5), −1 (80), +1 (22), −1 (110), +1 (5), −1 (42)] would represent a pulse with azimuthal angle of 0 degrees, elevational angle of 0 degrees, a signal-to-noise ratio −95 dB, a center frequency of 9500 MHz, and a pulse width of 2 μsec. This vector is more conveniently represented graphically as shown in FIG. 3.

Figure 4A:
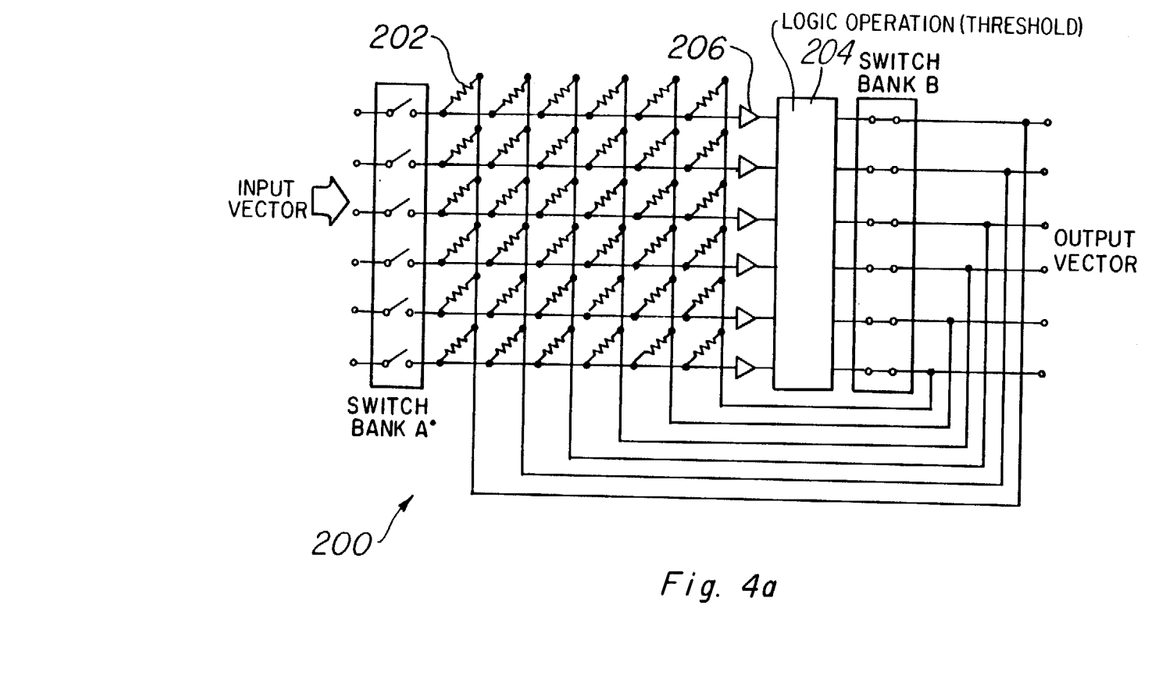
FIGS. 4a-b illustrates hardware usuable in the first preferred embodiment.
Figure 4B:
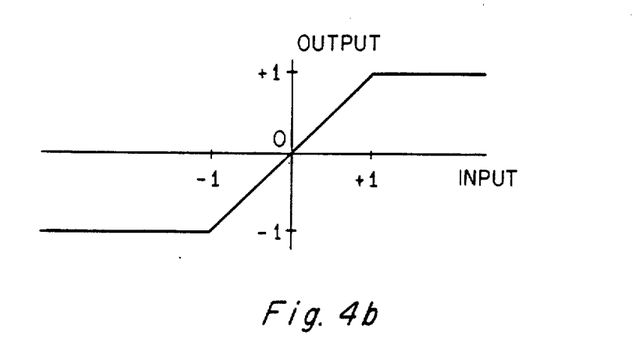

FIG. 4a schematically illustrates a six-neuron neural network fabricated from standard electronic components. The network, generally denoted by the reference numeral 200, includes rows and columns of wires interconnected by an array of transconductances $T_{i,j}$ 202, the horizontal wires connect to op amps 206 and threshold linear array 204 and switch bank B. Threshold linear array 204 has a transfer function as shown in FIG. 4b and essentially just limits the neuron states to the range −1 to 1. Neuron states correspond to voltages on the vertical wires and the connecting righthand portions of the horizontal wires. Switch bank A (with switch bank B open) is used to input the initial network state, and the buffers 206 may incorporate the synchronous timing. Network 108 could be a 400 neuron version of network 200.

The operation of network 108 proceeds as follows:

A sequence of emitter pulse data (such as in the Table above) of perhaps 300 pulses is encoded as a sequence of 300 400-component vectors with binary components (−1 or 1) and each vector is learned by network 108 using the Widrow-Hoff learning rule with a learning rate of 0.035. That is, the matrix of interconnection strengths, $T_{i,j}$, is modified to learn a new vector $V_j$ by $$\Delta T_{i,j} = \frac{\eta}{N} \left[ \sum_{1 \leq k \leq N} T_{i,k} V_k - V_i \right] V_j$$

where $\eta = 0.035$ is the learning rate and $N = 400$ is number of neurons. Each vector is learned four times. Note that if a vector $W_j$ is repeatedly learned, then the interconnections tend to saturate ($\Delta T_{i,j} \to 0$) and thus $W_j$ approximates an eigenvector of $T_{i,j}$ with eigenvalue $\lambda$ approximately equal to 1. That is, for $\Delta T_{i,j} \approx 0$ the term in the square brackets also approximates 0 for each i, which implies that for each i $$\sum_{1 \leq k \leq N} T_{i,k} V_k \approx V_i = \lambda V_i$$

with $\lambda = 1$. Of course, only an approximation to an eigenvector is expected because only a finite number of learnings occur, the thresholding limits the neuron values, and so forth.

Due to the dynamics of the Widrow-Hoff learning rule, similar input vectors merge to form a single eigenvector. These eignevectors become averages of the pulse vector information that contribute to them. Because of the normalization process of the learning rule, the stable states of the network have non-binary components—essentially becoming histograms of the contributing vectors.

After the 300 vectors are learned, they are put into clusters (which presumably correspond to the various radar emitters which have emitted the original pulses received by antenna 102) as follows: the first vector is input as the initial condition ($U_j(0) = V_j$) for network 108 to recall a vector by the following iterative process that converges towards an eigenvector:

$$U_j(t+1) = \text{Limit} \left[ \gamma \sum_k T_{j,k} U_k(t) + \beta U_j(t) \right]$$

where the "Limit" function constrains the values in the range from −1 to 1 and corresponds to the transfer function of FIG. 4b. The constants $\gamma$ and $\beta$ measure the positive/negative feedback in the algorithm and are taken to be 0.8 and 0.4, respectively. Note that for two eigenvectors $W_j$, $X_j$ of $T_{i,j}$ with eigenvalues $\lambda$, $\mu$, respectively, with $\lambda \approx 1$ (e.g., $W_j$ has been well learned) and $\mu \approx 0$ (e.g., $X_j$ has been poorly learned), the recall algorithm initialized at $U_j(0) = W_j + X_j$ will yield $$U_j(n) = (\gamma\lambda + \eta)^n W_j + (\gamma\mu + \eta)^n X_j$$

and thus the coefficient of $W_j$ grows with increasing n and the coefficient of $X_j$ shrinks to 0 with increasing n. So roughly the well learned eigenvector will be recalled and the poorly learned eigenvector will lost.

This first recalled vector is taken to be the first cluster vector, A, which presumably corresponds to one of the emitters 122, 124, 126, ...

The second vector from the 300 vectors is then input as the initial condition to recall a second vector from network 108, and this second recalled vector is compared to A by taking the dot product with A. If the dot product divided by the products of the vector lengths is greater than 0.9, then the second vector is considered to also correspond to the cluster with A, and the process continues to the third vector from the 300 vectors. Contrarily, if the second recalled vector has a dot product with A divided by the product of the second recalled vector length and the length of A is less than 0.9, then the second recalled vector is taken to be the second cluster vector, B. Note that if the 0.9 is replaced by a larger number such as 0.98, then more clusters will be found, and if 0.9 is replaced with a smaller number, then fewer clusters will be found. The examplar vector for each cluster can either be the initial recalled vector or the average of all vectors that contribute to the cluster.

In a similar manner, each of the vectors from the 300 vectors is input as the initial condition to recall a vector from network 108, and the recalled vector is compared to the previously determined cluster vectors A, B, ... to decide whether a new cluster vector has been found or whether the recalled vector corresponds to one of the previously found cluster vectors.

Figure 5:
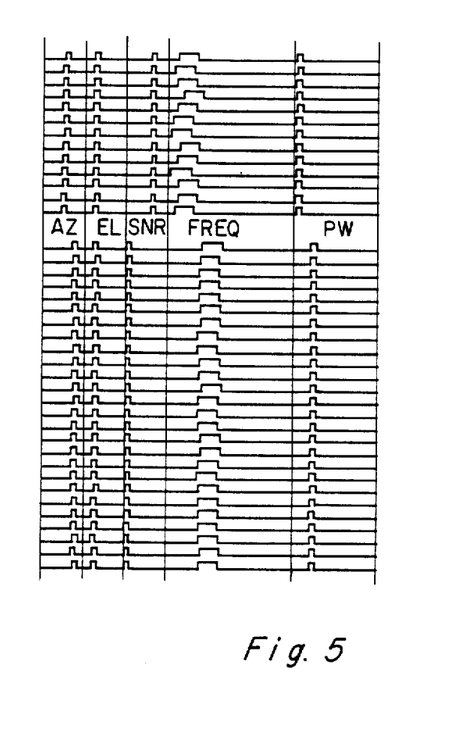
FIGS. 5-6 show learned data and recall data for the first preferred embodiment.
Figure 6:
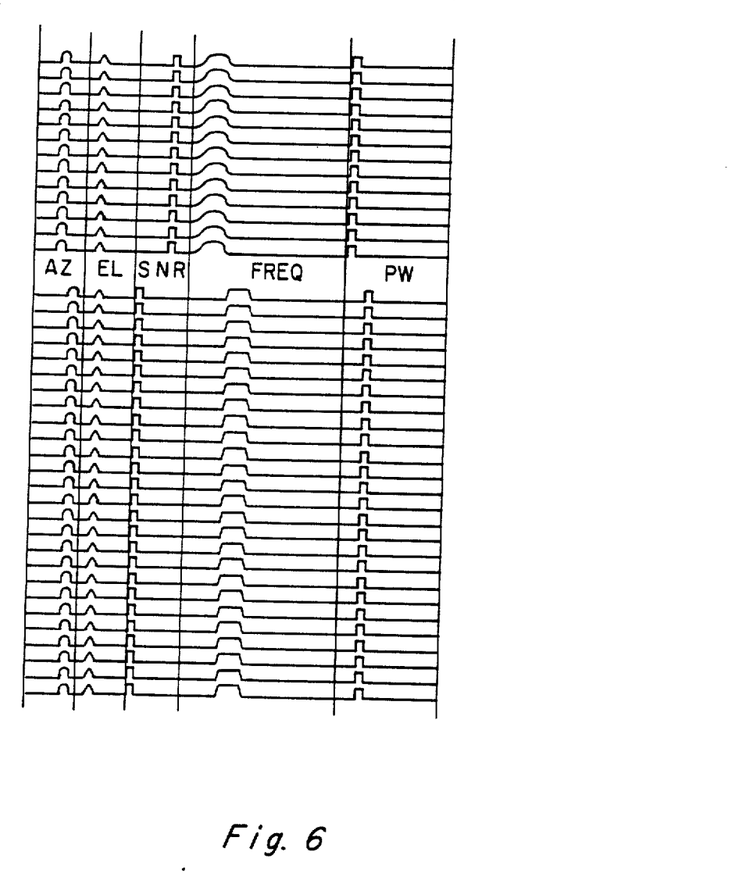

This is illustrated in FIGS. 5 and 6 which show the input pulses (out of time order) and the corresponding recalled results. The recalled vectors are the eigenvectors of the similar, learned vectors (note that all of the recalled vectors look the same and are approximations to a common eigenvector). The nonbinary aspect of the recalled vector is a measure of the variation (noise) of the input data. Thus the cluster vectors A, B, ... contain information in their shapes with regard to the variation of the original data. This information is a statistical summary of the original data that has been generated without any presumption as to the probability distribution of the original data as is typically done with standard digital signal processing in the known methods. Indeed, binary vectors were learned and the resulting cluster vectors recalled were an analogized version of binary vectors with input variation information determining the analog aspects. This shows why the frequency data was encoded with a block of twenty-two+1's to insure overlap of all of the blocks for for an emitter despite the variation in pulse frequencies by that emitter.

Once the vectors are clustered, then the pulse repetition rate can be computed from the time of arrival data in the pulse buffer but which was not encoded in the vectors. The pulse repetition rate information can then be encoded and concatenated with the cluster vectors or handled separately, although this is optional. The cluster vectors A, B, ... are then compared to stored information on known radar emitters by classifier 110 to identify the emitters corresponding to the clusters. Of course, the extrinsic information (azimuthal and elevation angles and signal-to-noise ratios) relates to the location of an emitter and the intrinsic information (frequency, pulse width, and pulse repetition rate) relate to the identity of an emitter, so only the intrinsic information portion of a cluster vector is used for comparison with known emitter types. The identities of the emitters are then used to determine subsequent actions. Note that the use of multiple features concatenated together in the encoded vectors together with a low precision for each feature (learning only a fews times for each encoded vector) allows an effective extraction of features including some statistical information.

Figure 7A:
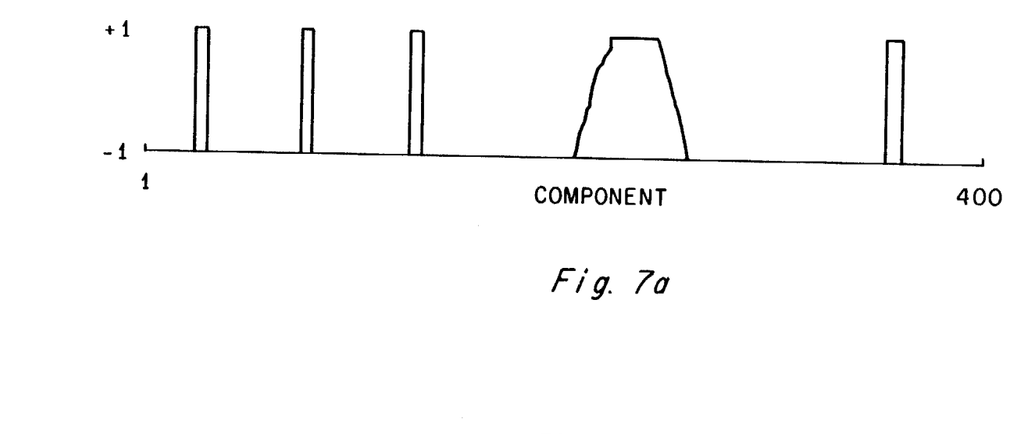
FIGS. 7a-b show recall data.
Figure 7B:
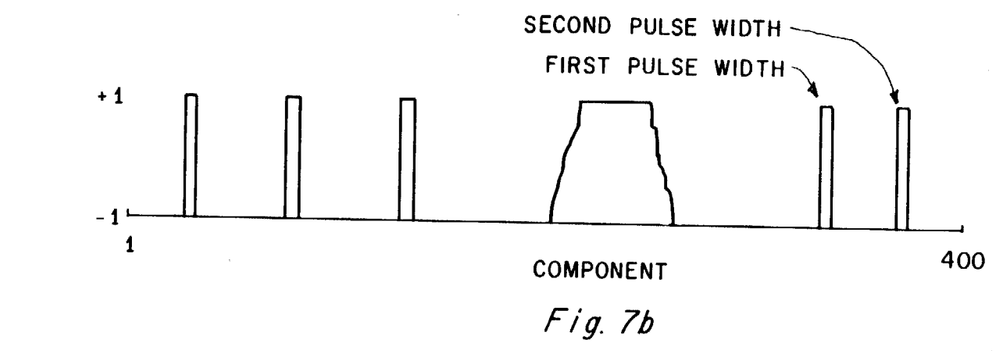

Classifier 110 includes a neural network that has already learned the intrinsic information on known emitter types, and thus already has approximate eigenvectors with shapes similar to those of the intrinsic information portion of the cluster vectors. The intrinsic information for an emitter may contain analog values. For example, an emitter may be known to have a high variation in its frequency. Thus the vector trained for this emitter would have a large, Gaussian distribution for the frequency (FIG. 7). As another example of the storage of analog data, an emitter may have two pulse widths. Instead of storing them as two separate entries in the classifier network, a hybrid vector, containing the analog histogram of the data, can be stored (FIG. 7). Classifier 110 identifies the emitter type corresponding to each of the cluster vectors by successively inputting each cluster vector and recalling an emitter-type vector by the same recall algorithm that converges towards an eigenvector:

$$U_j(t+1) = \text{Limit}\left[\gamma \sum_k T_{j,k} U_k(t) + \beta U_j(t)\right]$$

where again the "Limit" function constrains the values to the range from $-1$ to $1$ and corresponds to the transfer function of FIG. 3b. The constants $\gamma$ and $\beta$ are taken to be 0.73 and 0.3, respectively, and the iteration is performed ten times. Note that the length of the iteration vectors is not much different from that of the input because $0.73 + 0.3$ is close to 1.0, so the neurons are not pushed into saturation and the analog shape aspects are recoverable.

MODIFICATIONS AND ADVANTAGES

Various modifications of the preferred embodiment encoders and methods may be made while retaining the aspects of analog treatment of binary neural network data for extraction of statistical information and of analog performance of neural networks, and the use of many low precision concatenated features to form the network vectors.

For example, other types of information and signals may be processed, a neural network may be used for the initial clustering and standard digital signal processing for the classification, a neural network may be used for the classification with standard signal processing for the clustering, after a first clustering additional information may be determined (e.g., pulse repetition rate) and concatenated onto the vectors and other information deleted from the vectors (e.g., extrinsic), the number of neurons in the network can be varied, the encoding by closeness code may be with different length blocks or even with the neurons corresponding to the block permuted (so the representation of FIG. 3 would have the blocks split apart and shuffled), the encoding may have levels of precision such as a block for a more significant portion of a number and another block for a less significant portion of the number, the recall parameters may be varied, the learning constant and the number of learning presentations may be varied, the number of recall steps may be varied, . . .

Prior to this work, common practice dictated that the $\beta$ and $\gamma$ parameters should sum to approximately 1.3. This would insure that the value of each component of the output vector would be saturated. By bringing the sum of the $\beta$ and $\gamma$ to 1.03, we have prevented the values of the neurons from always becoming saturated.

What is claimed is:

1. An information processor, comprising:
   (a) an encoder, said encoder encoding input information into a closeness code format and providing an output in response thereto; and
   (b) a clustering neural network providing an output therefrom, said clustering network having an input receiving said output of said encoder and said output of said clustering network, said clustering neural network clustering said input thereto with thresholded analog neurons in conjunction with a learning rule and a recall rule to preserve analog aspects.

2. The processor of claim 1, further comprising:
   (a) a classifying neural network having stored information in a format of vectors recalled from said clustering network using said recall rule, said classifying network comparing said stored information recalled from said clustering network with other information stored therein with a second recall rule.

3. The processor of claim 1, wherein:
   (a) said learning rule is a Widrow-Hoff learning; and
   (b) said recall rule is a BSB-type recall rule.

4. A method of information processing, comprising the steps of:
   (a) encoding said information into closeness code format;
   (b) clustering said encoded information with a thresholded analog neural network;
   (c) comparing recalled versions of said encoded information with stored information.

5. The method of claim 4, wherein:
   (a) said stored information is stored in a second thresholded analog neural network; and
   (b) said comparing is by inputting said recalled versions of said encoded information into said second thresholded network and recalling said stored information.

6. The method of claim 4, comprising the further steps of:
   (a) deleting a portion of each of said recalled versions; and
   (b) adding further information to each of said recalled versions 7. A method of processing multiple-feature information, comprising the steps of:
   (a) encoding information by concatenated closeness codes of features of said information;
   (b) learning without saturation said encoded information in a thresholded analog neural network; and
   (c) inputting said encoded information into said network and recalling processed versions of said encoded information.

* * * * *